May 23, 1933.   L. E. GILES   1,910,914
SEMIMETALLIC PACKING AND METHOD OF MAKING THE SAME

Filed June 20, 1931

Inventor
Louis E. Giles,
By his Attorneys,
Fraser, Myers & Manley.

Patented May 23, 1933

1,910,914

UNITED STATES PATENT OFFICE

LOUIS E. GILES, OF NEW YORK, N. Y., ASSIGNOR TO THE GARLOCK PACKING COMPANY, OF PALMYRA, NEW YORK, A CORPORATION OF NEW YORK

SEMIMETALLIC PACKING AND METHOD OF MAKING THE SAME

Application filed June 20, 1931. Serial No. 545,658.

This invention relates to improvements in semi-metallic packings and in the soft metal cores of such packings, and in the method of making such cores. The packing is of the type well adapted for use in sealing the joint around the piston rod of an engine, pump, or other power unit, having a cylinder within which liquids or gases are to be maintained either materially above or materially below atmospheric pressure.

It is an object of the invention to provide a packing of the above-described character comprising a soft metal core of relatively simple construction, which may be securely embedded in a backing of fibrous material and rubber composition and readily bent to the curvature of the surface of the piston rod without causing any creeping or relative disarrangement of parts of the core with respect to the covering element.

Other features and objects of the invention will develop as the description advances.

In the drawing illustrating the preferred form and a modified form of the invention,—

Figure 1:
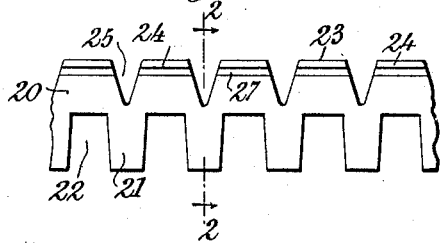
Figure 1 is a side view and Fig. 2 a transverse sectional view of a soft metal strip or blank from which the core of the packing may be constructed.
Figure 2:
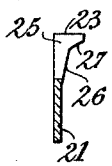
Figure 3:
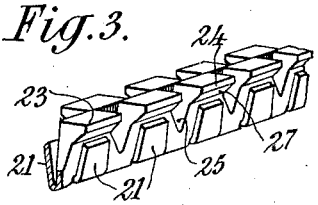
Fig. 3 is a perspective view of a short length of packing core made by placing two strips of material like the blank illustrated in Fig. 1 side by side and bending the downwardly-extending fingers in opposite directions to a hook-like form so that each finger of one strip will embrace an adjacent portion of the other strip.
Figure 7:
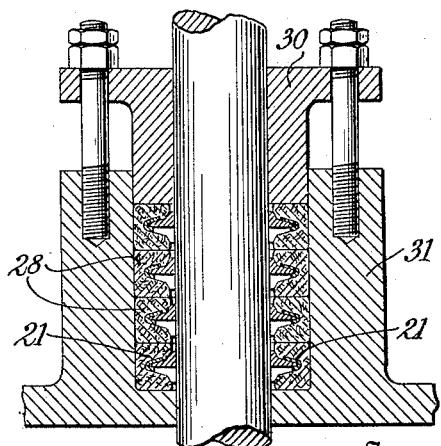
Fig. 7 is a longitudinal sectional view through the stuffing-box of a power element, illustrating the manner in which the packing may be used to seal the joint about a piston rod.

The blank from which the core of the packing embodying the above-described invention is made, as best illustrated in Figs. 1 and 2, comprises a strip of lead, Babbitt metal, or other appropriate material, 20, having a series of equally-spaced extensions or fingers 21 separated by recesses 22, the recesses being of substantially the same width as the fingers so that two lengths of the blank may be placed side by side with the fingers of one blank opposite the recesses of the other and the fingers bent alternately in opposite directions to lock the two strips of material together, as indicated in Fig. 3. Preferably the fingers 21 will be slightly tapered so that the entrance portion of each recess 22 will be of slightly greater width than the end of the finger 21 which is required to enter the recess when assembling the parts of the core.

The portion of the blank 20 opposite the extensions or fingers 21 has a surface 23 so disposed as to serve as its wearing face. The portion of the blank beneath the wearing face 23 is preferably subdivided into a plurality of equally-spaced wearing elements 24 by a series of cuts, recesses or notches 25. The spacing of the notches 25 and the spacing of the fingers 21 should be such as to cause the center of each notch to be in alignment with the center of one of the fingers.

Figures 5, 9:
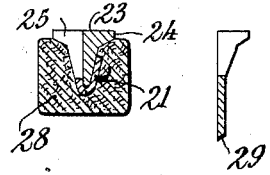
Fig. 5 is a transverse sectional view through the finished packing resulting from the embedding of the core of Fig. 3 in a backing of covering material, the section being taken along the line 5—5 of Fig. 6.
Fig. 9 is a cross-section through a modified form of blank having the end of the finger beveled.
Figure 4:
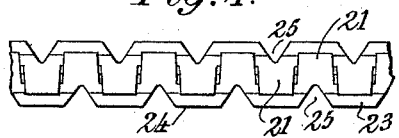
Fig. 4 is a bottom view of the core illustrated in Fig. 3.

Any suitable length of packing core like that illustrated in Figs. 3 and 4 may be readily made from the strip material illustrated in Fig. 1 by cutting two lengths of the strip material, placing them side by side with the fingers of one strip opposite the recesses of the other, and then bending each finger of one strip between the two fingers of the other about the material at the base of the adjacent recess, so that the end portion of the finger will be brought into contact with the surface of the opposed strip with its end directed upwardly as indicated in Fig. 5. This bending of the fingers alternately in opposite direction into an interengaging relation such that the fingers of each strip clasp the base portion of the opposite strip causes the two elements of which the core is made to be securely locked together in such manner as to prevent relative movement in any direction. This interlocking of the equally-spaced fingers also causes the notches 25 and wearing elements 24 to be disposed in a staggered relation, as indicated in Fig. 3, such that the end of each notch of one strip is closed by a wearing element of the other strip.

Preferably the outer surface of the blank 20 will be flared from its base portion, from which the fingers 21 extend, outwardly towards the wearing surface 23. This flaring may be gradual for a portion of the distance as at 26 (Fig. 2), and more abrupt for the remainder of the distance as at 27. This gives the finished core a wedge-like form as indicated in Fig. 5 and disposes the greater part of the metal at the wearing face.

Figure 6:
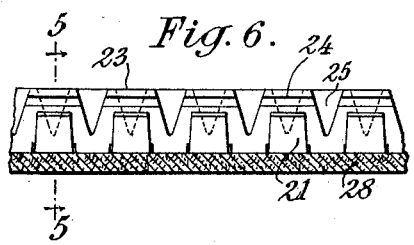
Fig. 6 is a side view of the packing illustrated in Fig. 5, the backing of covering material being indicated in cross-section.

The above-described core may be embedded in a covering or backing of fibrous material and rubber composition 28, as best indicated in Figs. 5 and 6. If the packing is to be subjected to high temperature, the fibrous material may comprise some heat-resistant substance such as asbestos.

The metal core may be very firmly and securely embedded in and united with the covering material, which should extend into the spaces between and above the fingers 21 so as to prevent endwise movement of the core with respect to the backing and also to prevent the core from being expelled by the backing when compressed in the stuffing-box.

The core need not be buried completely to its wearing face in the backing, but may, as indicated in Fig. 5, have a portion of each wearing element elevated slightly above and supported on the upper surface portion of the underlying covering material.

If desired, the ends of the fingers may be beveled as at 29 (Fig. 9), to permit the covering material to be more readily worked into the spaces between the upper ends of the fingers and the under surfaces of the wearing elements.

It will be apparent that the fingers 21 serve a three-fold function. They firmly lock the two elements of the core together; they maintain them in a permanent longitudinal relationship with the notches of one strip directly opposite the wearing elements of the other; and they serve as anchors to prevent the core from being pulled out of the backing or from being shifted lengthwise in the backing.

Figure 8:
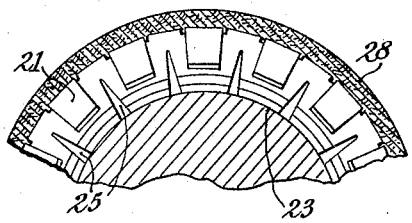
Fig. 8 is a view in transverse cross-section drawn to a larger scale, illustrating a portion of the packing bent to circular form to cause its wearing face to conform with the curvature of the surface of a piston rod.

The notches in the wearing portion of the core elements and the recesses between the fingers in their base portions tend to make the core flexible so that it can be very readily bent from rectilinear form to the curved form indicated in Fig. 8. Moreover, the neutral axis of the core when bent is substantially halfway between the outer and the inner surface of the cover portion or backing, so that, when the strip of finished packing is being bent from rectilinear form to circular form, there is little or no tendency for any part of the core to creep or shift its position with respect to the adjacent portions of the covering material.

The wedge-like form of the core is of importance as a means of maintaining its wearing elements in snug contact with the piston rod. By drawing up the gland 30 of the stuffing-box 31 to an appropriate extent, the backing of the packing elements may be slightly flattened, and, due to the wedge-like form of the core and the abrupt flaring surfaces of the wearing elements which contact with the adjacent portions of the covering material, the core may be thrust and held in snug contact with the surface of the rod.

The making of the core from a blank of strip material which may be cut to form complementary core elements materially simplifies the manufacture of the finished product, thus resulting in a reduction in labor and a corresponding reduction in cost of production. The two-part core is, however, not only cheaper than a one-part core, but is better. Its greater flexibility facilitates the bending of the packing to the curvature of the piston rod and the component elements of the two-part core may be more satisfactorily held in contact with the surface of the piston rod than the elements of a more unyielding one-part core.

The invention is not intended to be limited to the specific form herein disclosed for purposes of illustration, but should be regarded as including variations and modifications thereof within the scope of the appended claims.

What is claimed is:—

1. A core for a semi-metallic packing comprising two contacting complementary strips of soft metal each having a surface portion which co-operates with a surface portion of the other to provide a wearing face and each having a base portion opposite its wearing face comprising spaced hook-like fingers embracing adjacent portions of the other, the fingers of the two strips being staggered so that each finger of one strip clasps a portion of the other strip between a pair of its fingers.

2. A core for a semi-metallic packing, as defined by claim 1, having spaced notches extending transversely through the portions of its strips which comprise its wearing face, the notches in the two strips being staggered so that the wearing element between each pair of notches of one strip will close one end of the notch between a pair of wearing elements of the other.

3. A core for a semi-metallic packing, as defined by claim 1, having spaced notches extending transversely through the portions of its strips which comprise its wearing face, the notches of each strip being located opposite the respective hook-like fingers of the same strip, whereby each finger of one strip will embrace a portion of the other strip midway between two of the notches in its wearing face.

4. A core for a semi-metallic packing, as defined by claim 1, of which the opposite side walls are flared outwardly from its base portion from which its hook-like fingers extend to its wearing face, whereby the wearing elements of one strip may overhang the upturned fingers of the other.

5. A semi-metallic packing having a core like that defined by claim 1 and a covering of fibrous material and rubber composition for its base and opposite side portions, the parts of the core being thoroughly embedded in the covering material so that the latter will extend into the recesses between and above the fingers of the core and tend to prevent relative movement.

6. A semi-metallic packing having a core, like that defined in claim 1, of which the two strips are abruptly flared outwardly in opposite directions beneath the portions which serve as wearing faces, and a covering of fibrous material and rubber composition within which the core is embedded, the covering material being extended into the spaces between and above the fingers and beneath the abruptly flared portions of the wearing elements so as to serve as a backing for the same.

7. A semi-metallic packing having a core, like that defined by claim 1, of which the wearing elements are extended laterally by being abruptly flared outwardly beneath the wearing surfaces, and a covering of fibrous material and rubber composition within which the core is embedded, the wearing elements being exposed above the upper surface of the covering, portions of which underlie the abruptly flared surfaces so as to serve as a backing.

8. A soft metal strip adapted for use in the making of a core for a semi-metallic packing, said strip having a surface portion divided into a plurality of wearing elements by a series of equally-spaced transverse notches and an opposite base portion provided with relatively thin, flexible, equally-spaced fingers, each notch of the wearing portion being located directly opposite one of the fingers of the base portion, and the widths of the fingers being not greater than those of the intervening spaces.

9. The method of making a core for a semi-metallic packing which consists in placing two strips of soft metal, like the one defined by claim 8, in a side-by-side relation with the fingers of the base of one strip opposite the spaces between the fingers of the base of the other and then bending each finger of one strip between two fingers of the other into snug contact with the outer surface of the other strip, thus firmly interlocking the two strips so as to produce a unitary structure.

In witness whereof, I have hereunto signed my name.

LOUIS E. GILES.